United States Patent [19]

Isaksson

[11] Patent Number: 5,347,605
[45] Date of Patent: Sep. 13, 1994

[54] OPTOELECTRONIC COMPONENT HAVING SPHERICAL ADJUSTING MEANS

[75] Inventor: Jan Isaksson, Täby, Sweden

[73] Assignee: Asea Brown Boveri AB, Vasteras, Sweden

[21] Appl. No.: 129,126
[22] PCT Filed: Mar. 21, 1992
[86] PCT No.: PCT/SE92/00200
§ 371 Date: Oct. 8, 1993
§ 102(e) Date: Oct. 8, 1993
[87] PCT Pub. No.: WO92/20171
PCT Pub. Date: Nov. 12, 1992

[30] Foreign Application Priority Data

May 6, 1991 [SE] Sweden .................. 9101344

[51] Int. Cl.⁵ ............................. G02B 6/42
[52] U.S. Cl. ............................ 385/92; 385/90; 385/93
[58] Field of Search ..................... 385/88–94

[56] References Cited

U.S. PATENT DOCUMENTS

| 4,781,429 | 11/1988 | Cartier | 385/88 X |
| 4,997,254 | 3/1991 | Ganev | 385/90 |
| 5,095,517 | 3/1992 | Monguzzi et al. | 385/90 |
| 5,127,075 | 6/1992 | Althaus et al. | 385/94 |

FOREIGN PATENT DOCUMENTS 0250331 12/1987 European Pat. Off. .
2586305 2/1987 France .
1-182806 7/1989 Japan .................. 385/93

OTHER PUBLICATIONS

IBM Technical Disclosure Bulletin; vol. 33; No. 1A; Jun. 1990, pp. 456–457.
PCT Search Report Appl'n No. EP 87401384, Aug. 1987.

Primary Examiner—John D. Lee
Attorney, Agent, or Firm—Watson, Cole, Grindle & Watson

[57] ABSTRACT

An optoelectronic component has a housing (3) connected to a light guide (7, 8) for transmission of light to/from two optoelectronic semiconductor elements (1, 2) mounted in the housing. Light to a first one of the semiconductor elements (2) is deflected towards this element by a partially transmitting mirror (5). For common adjustment during assembly, the semiconductor element (2) and the mirror (5) are spherically journalled in the housing. The second semiconductor element (1) is rotatably journalled in relation to the mirror (5) and the first semiconductor element (2) for adjustment during assembly.

6 Claims, 4 Drawing Sheets

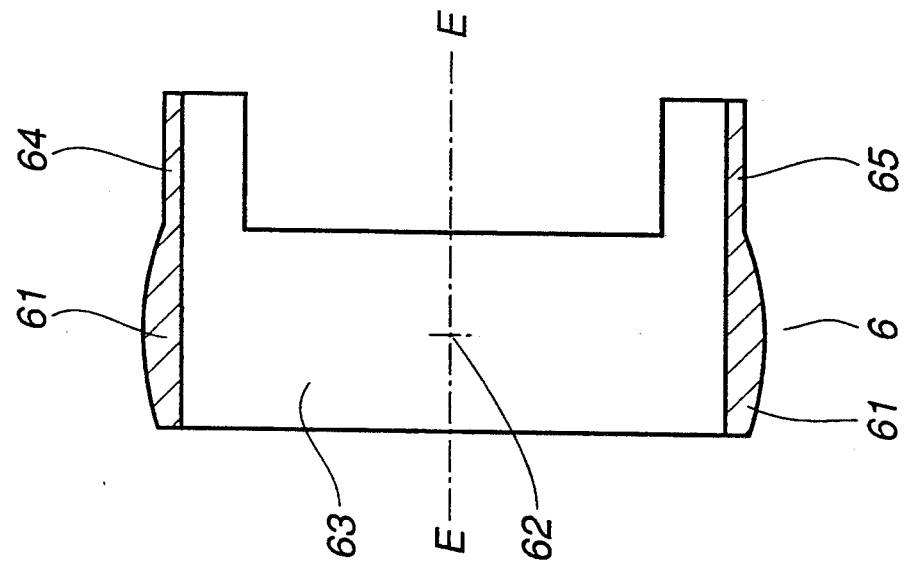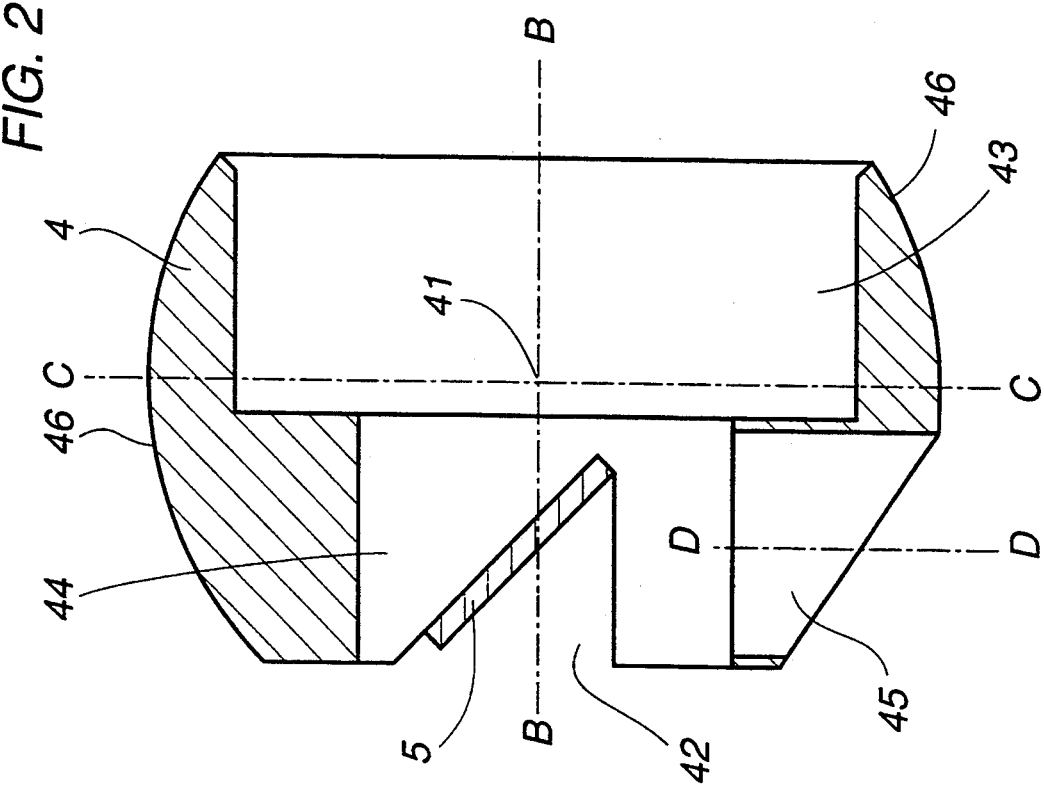

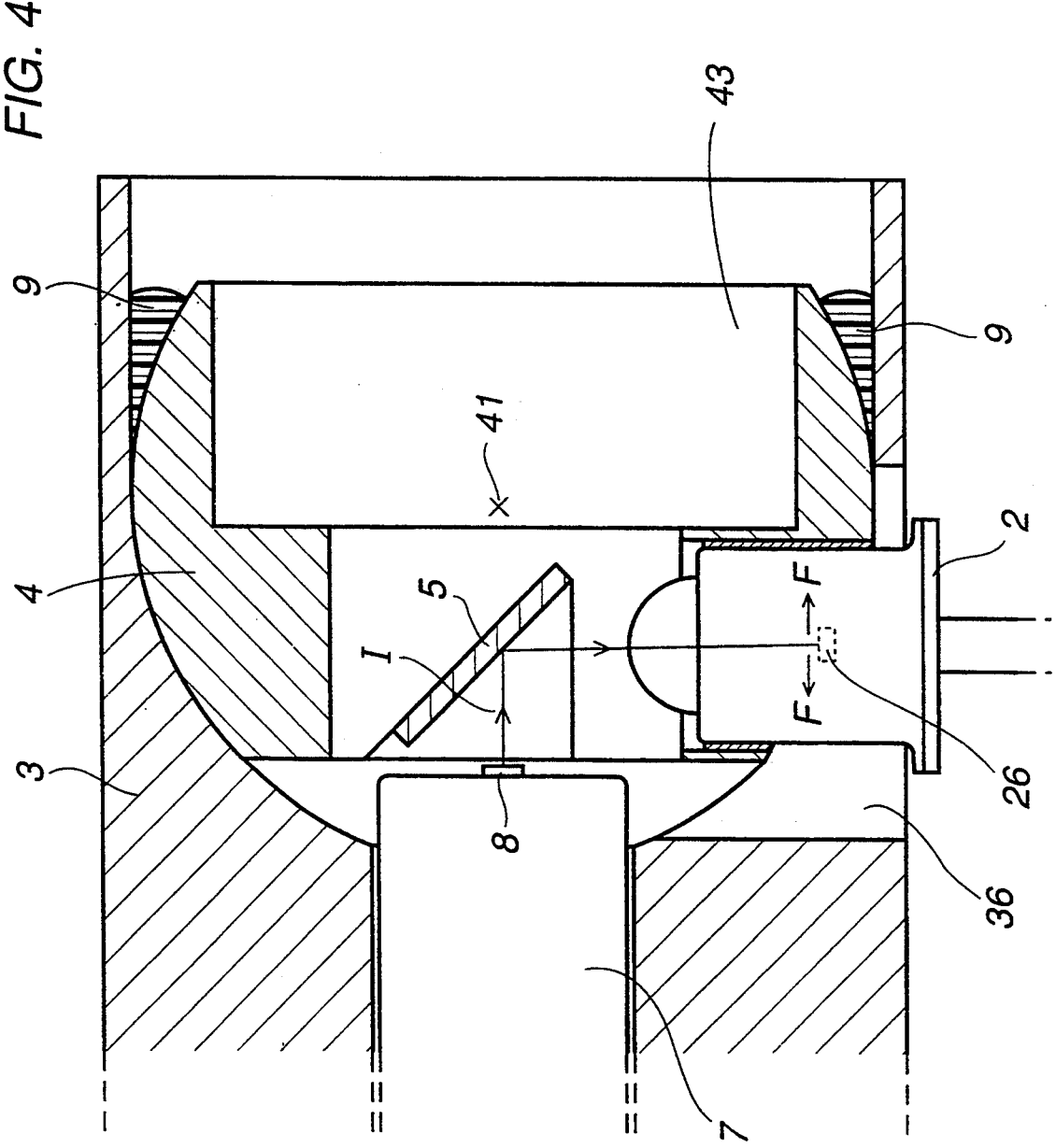

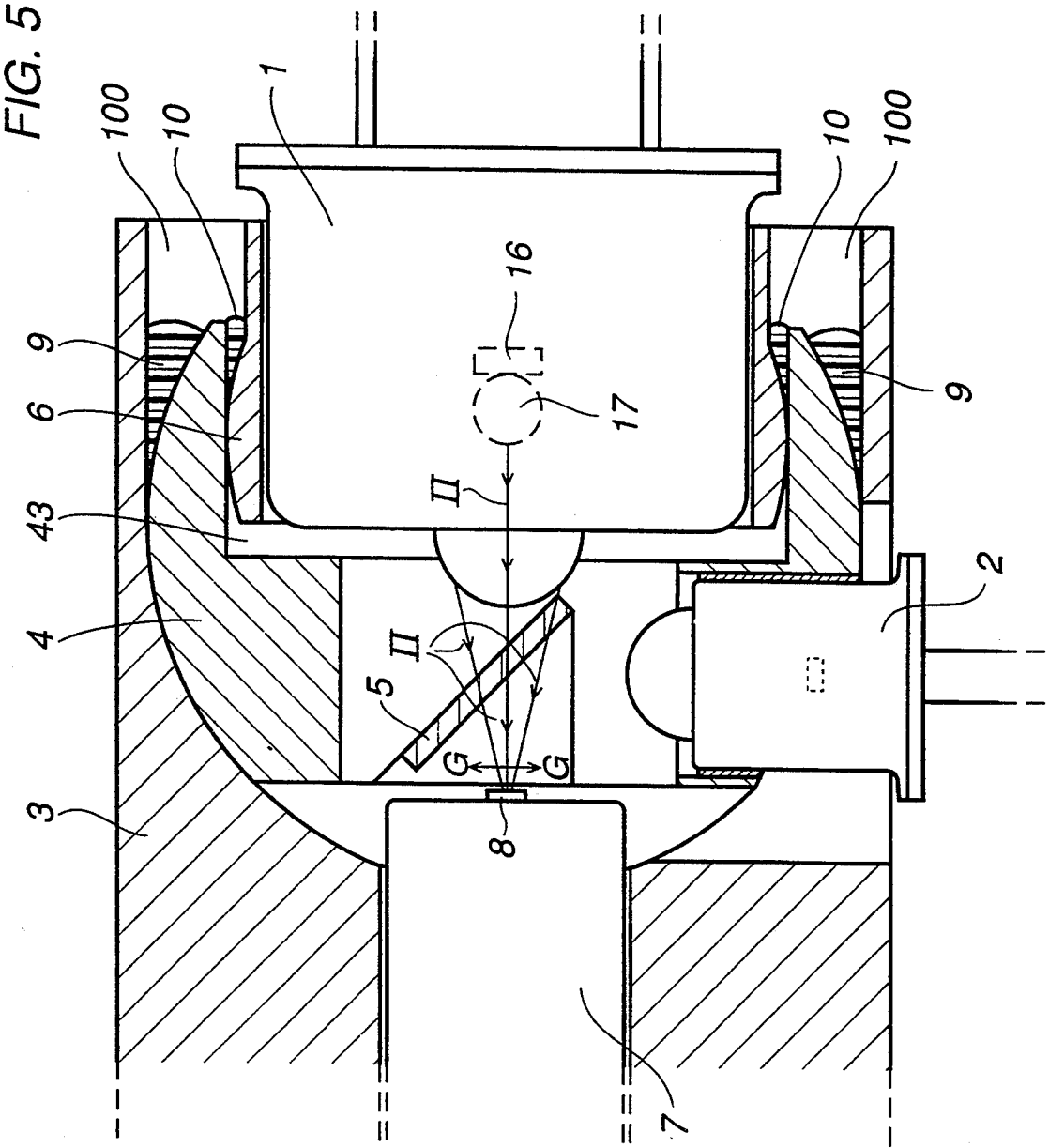

OPTOELECTRONIC COMPONENT HAVING SPHERICAL ADJUSTING MEANS

TECHNICAL FIELD

The present invention relates to an optoelectronic component with a housing in which a first and a second optoelectronic semiconductor element as well as a partially transmitting mirror for deflecting light to or from the first semiconductor element are arranged.

BACKGROUND ART

Optoelectronic components of the kind mentioned above are previously known. A light emitting diode (LED) and a photodetector, for example, are arranged in a housing close to the end of a light guide. The LED may then, for example, be arranged in the extension of the longitudinal direction of the light guide. A partially transmitting mirror is arranged between the LED and the end of the light guide, and the mirror deflects light entering through the light guide in a direction towards the photodetector. By a partially transmitting mirror is meant here a member which partially transmits and partially reflects incident light.

It is known, per se, to arrange an LED of the above-mentioned kind such that it is to a certain extent adjustable in relation to the housing, for example by providing a certain play between the LED and the housing. During assembly of the component, the light guide is first mounted in the housing, whereupon the LED is placed in the housing and connected to a current source. The intensity of the light flowing out from the remote end of the light guide is measured, and the orientation of the LED is adjusted so as to obtain a maximum value of this intensity. In this position, the LED is mechanically locked to the housing, for example with the aid of quick curing plastic, whereupon, if desired, any gaps between the LED and the housing may be filled with plastic to obtain good mechanical stability of the components.

The above-mentioned method of adjustment, however, is less suitable for a photodetector. Generally, the light guide is not exactly centered in the housing. Further, its longitudinal direction normally deviates from the ideal direction. The angle of the partially transmitting mirror generally deviates somewhat from the theoretically correct one. Likewise, the light-receiving semiconductor element of the photodetector is generally not exactly accurately located in a plane perpendicular to the optical axis of the detector. For these reasons, the radiation which is caused to become incident upon the semiconductor element of the photodetector will generally not be centered in relation to the semiconductor element. In known components of the kind described here used up to the present, this fact has necessitated the use of a relatively large area of the semiconductor element of the photodetector, the reason for this being to ensure that a sufficiently large part of the radiation which is incident upon the detector really hits the detector despite the above-mentioned unavoidable error sources. Since the performance of a large-area photodetector is inferior to that of a small-area detector, prior art components have possessed less good operating properties than what would have been theoretically possible.

From EP-A10 250 331, it is previously known to arrange a light-emitting member and a light-detecting member in the same housing for bidirectional optical signal transmission via one and the same optical fibre. In this device, both members lack possibilities of adjustment, and therefore especially the photodetector has the disadvantages mentioned in the preceding paragraph.

From FR-A1 2 586 305 a component of the same kind is previously known, in which the end surface of the optical fibre is obliquely bevelled for optical coupling to one of the members by reflection at the end surface and to the other member by refraction at the end surface. The desired bevelling of the end surface of the fibre is difficult to achieve from the point of view of manufacturing with the desired accuracy. Further, the light reflected by the end surface of the fibre is diffusely scattered during its passage through the envelope surface of the fibre, which considerably deteriorates the optical coupling between the fibre and that of the two optoelectronic members which utilizes the light reflected at the end surface. This diffuse scattering also causes the adjustment to become more complicated and—in the event the member in question is a photodetector—necessitates the provision of a relatively large area for the member, which deteriorates the operating properties of the member.

IBM Technical Disclosure Bulletin Vol. 33, No. 1A, June 1990, pages 456/457, shows a component with one single optoelectronic member, a laser diode, which emits light via a lens. To be able to align the laser diode in relation to the lens, double spherical bearings are arranged, which permits alignment in five degrees of freedom. The simultaneous alignment of the two spherical bearings becomes complicated.

SUMMARY OF THE INVENTION

The present invention relates to an optoelectronic component of the kind described in the introductory part of the description, which allows a possibility of a quick, simple and efficient adjustment of the two semiconductor elements included in the component and thereby a faster and cheaper manufacture of the component as well as a possibility, in connection with a photodetector, of using semiconductor elements with small dimensions and thus higher performance. The invention also aims to provide a component in which the two semiconductor elements included are adjustable to maximum efficiency independently of each other.

What characterizes a component according to the invention will become clear from the appended claims.

BRIEF DESCRIPTION OF THE DRAWINGS

In the following the invention will be described with reference to the accompanying FIGS. 1-5. FIG. 2 shows a section through a mounting body included in the component for adjustable mounting of the photodetector and the mirror. FIG. 3 shows a section through a second mounting body for adjustable mounting of the LED. FIG. 4 shows, in connection with a section through the component, the principle of adjustment of the photodetector. FIG. 5 shows in similar manner the principle of adjustment of the LED.

DESCRIPTION OF THE PREFERRED EMBODIMENTS

Figure 1:
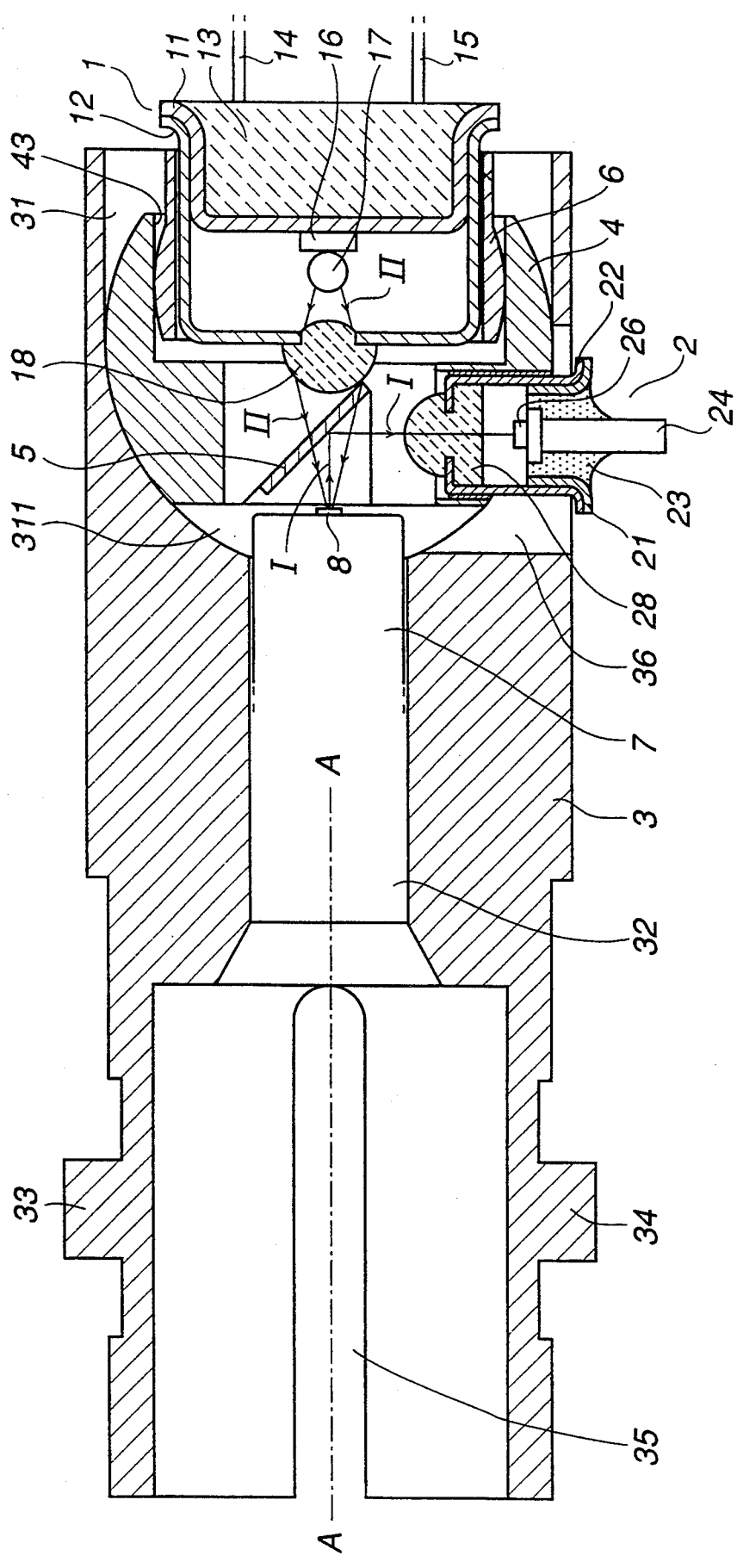
FIG. 1 shows a section through a component according to the invention, which has an LED, a photodetector as well as connection means for a light guide.

FIG. 1 shows an optoelectronic component which constitutes one embodiment of the invention. The component comprises two optoelectronic semiconductor elements, an LED 1 and a photodetector 2. These are arranged in a housing 3, which is provided with members for connection of a light guide 7. The LED is adapted to emit radiation towards the light guide for transmission therethrough, and the photodetector is adapted to receive optical radiation which enters through the light guide.

The LED 1 has a base 11, on which a semiconductor body 16 is mounted, which constitutes the active and light-emitting element of the LED. Adjacent to the semiconductor body there is arranged a lens 17 for focusing the radiation. Further, the LED has a casing 12 which is provided with an exit opening for the radiation, in which a lens 18 is arranged. The lenses 17 and 18 focus the radiation towards the end 8 of the optical fibre of the light guide 7. The LED is provided with schematically shown connection conductors 14, 15 and its base is filled with glass or a plastic material 13.

In the same way as above, the photodetector 2 has a base 21, in which a connection conductor 24 is embedded with the aid of an insulating material 23. On the upper surface of the conductor in the figure there is mounted a semiconductor body 26, which constitutes the active element of the detector. The semiconductor body may consist of a photodiode, a phototransistor, or some other photo-detecting component. The detector has a casing 22 with an entry opening for the incident optical radiation. In this opening a lens 28 is arranged for focusing the incident light towards the semiconductor body 26.

The housing 3 is made of metal and is substantially rotationally symmetrical with a symmetry axis A—A. The housing is provided with an axial bore 32 to accommodate the light guide 7. Further, the housing has means for securing the light guide to the housing in the form of projections 33, 34 for a bayonet socket as well as a guide slit 35. In the part of the housing shown on the right in the figure, the housing has a cylindrical recess 31, the part 311 of which facing the light guide has a semispherical shape. Further, the housing has an opening 36 shown in the downward direction in the figure, in which the photodetector is arranged. Further, the housing has fixing members (not shown) in the form of fixing lugs, projections, or the like.

The figure schematically shows a ray, designated I, entering through the light guide as well as two rays, designated II, emitted from the LED. The symmetry axis and the optical axis of the LED approximately coincide with the longitudinal axis of the light guide 7, whereas the optical axis of the photodetector 2 is approximately perpendicular to the longitudinal axis mentioned. Between the LED and the end of the light guide 7, a partially transmitting mirror 5 is arranged. This may consist of a glass plate which is provided with a suitable semi-reflecting coating, or partially coated with a pattern of a completely reflecting coating. In that way, the mirror 5 lets through light emitted from the LED in a direction towards the end of the light guide, and the mirror further reflects light exiting from the light guide end downwards in the figure in a direction towards the photodetector.

The photodetector 2 and the mirror 5 are mounted in a first mounting body 4 which has a spherical envelope surface with approximately the same radius as the semispherical part 311 of the recess 31. The mounting body 4 and hence the photodetector 2 and the mirror 5 may thus, during assembly of the component, be rotated to the desired position in relation to the housing 3. The body 4 may suitably be made of metal or of a plastic material. The LED 1 is surrounded by a second mounting body in the form of a metal ring 6, for example made of aluminium. The ring 6 has a double-curved envelope surface, which makes contact with the edge of a recess 43 in the body 4. The envelope surface may, for example, have an approximately spherical shape with a radius which coincides with the radius of the recess 43. In this way, during assembly, the ring 6 with the LED 1 applied therein may be rotated to the desired orientation as well as axially displaced in relation to the body 4 to a suitable position.

FIG. 2 shows a section through the first mounting body 4. The body is substantially rotationally symmetrical and has an at least approximately spherical envelope surface 46. The body has the symmetry axis B—B. A diameter C—C of the spherical envelope surface 46, which diameter is perpendicular to the axis B—B, intersects the symmetry axis at a point 41, which thereby will constitute the centre of rotation of the body. The body is provided with triangular recesses 42, at the oblique edges of which the mirror 5 is attached, for example by gluing. The body has a round through-hole with the axis B—B and with a portion 43 with a larger diameter for accommodating the LED with the ring 6 and a portion 44 with a smaller diameter. Further, the body has a round hole 45 with the axis D—D, in which the photodetector 2 is mounted by pressing and/or gluing.

FIG. 3 shows the second mounting body, the metal ring 6. The part thereof shown on the left in the figure is rotationally symmetrical with a round hole 63 for accommodating the LED 1 and with an external envelope surface 61 with an approximately spherical shape and with a centre at the point 62. The body 6 has two resilient parts 64, 65 projecting to the right in the figure, which ensure the fixing of the LED 1 to the body 6.

FIG. 4 shows that end of the housing 3 in which the LED and the photodetector are arranged and intends to illustrate the method during the assembly. During the assembly, the detector 2 and the mirror 5 are first attached to the mounting body 4, which is then inserted to the position in the housing 3 shown in the figure. Further, the light guide 7 is mounted at the housing 3. At the opposite end of the light guide, light is sent into the light guide, and the photodetector is connected to measuring means for determining the intensity of the incident light. With the aid of a suitable tool, for example a rod which fits into the recess 43 of the body 4, the body 4, and thus the mirror and the detector, are then adjusted by rotating the body in relation to the housing until maximum light intensity is obtained from the detector. With the aid of the tool just mentioned, the body 4 may be rotated around its centre of rotation 41. The rotation can be made around an axis through the point 41, which axis is perpendicular to the plane of the paper, which entails a movement of the image of the fibre end 8 on the active element 26 of the photodetector along the path designated F—F. Rotation can also be performed around an axis through the point 41 in the plane of the paper and perpendicular to the longitudinal axis of the light guide 7. This entails a movement of the above-mentioned image in a path perpendicular to the plane of the paper. The opening 36 in the housing 3 has such a large diameter that there is sufficient clearance between the housing and the detector 2 to make possible this adjustment. In this way, the detector 2 may be simply and rapidly brought to such a position that the largest possible part of the incident light through the light guide hits the active part 26 of the detector. When this position has been reached, the body 4 is fixed to the housing 3 with the aid of glue, thermosetting resin or the like, designated 9 in the figure. The glue or the resin is suitably applied around the whole gap between the body 4 and the housing 3.

Thereafter, as shown in FIG. 5, the LED 1, mounted in its mounting ring 6, is inserted into the hole 43 of the body 4. The LED is connected to a current source and is thus brought to emit light. Light rays II emitted from the LED are focused against a point at the end of the light guide. Generally, this point will not be located at the end surface of the optical fibre 8, which is due to unavoidable deviations during manufacture and assembly. A measuring member is connected to the opposite end of the light guide 7 for detecting the intensity of the light which exits from the light guide. The LED with the ring 6 can now be rotated and also be axially displaced until maximum intensity of the light detected at the opposite light guide end is achieved. The LED is then in its optimal position and is fixed in relation to the body 4, for example with the aid of a fast drying glue 10 which is applied in the gap between the ring 6 and the body 4. To obtain increased mechanical stability, the space 100 between the LED 1, the housing 3, the body 4 and the ring 6 may then, if desired, be filled with a suitable material, for example epoxy resin.

As will be clear from, for example, FIG. 4, the centre of rotation 41 of the body 4 is separated from the point where an incident ray hits the mirror 5. It has been found that this embodiment makes possible an exceedingly rapid and efficient adjustment of the photodetector to maximum efficiency.

In an optoelectronic component according to the invention, thus, a rapid and simple assembly is obtained while at the same time the efficient adjustment provides a maximum utilization of the semiconductor components. By the good possibilities of adjustment, the manufacturing tolerances may be kept lower than what would otherwise have been possible without entailing any disadvantages. Further, the active semiconductor body of the photodetector may be formed with a considerably smaller area than what has been possible so far, whereby considerably improved performance, such as lower capacitance and lower dark current, can be obtained.

The component according to the invention described above is only one of a large number of feasible embodiments. Thus, the invention is applicable also to such components where both of the semiconductor components included consist of photodetectors or where both the semiconductor components included consist of light-emitting semiconductor elements.

The light-emitting semiconductor element has been assumed in the above embodiment to be an LED, but as an alternative it may, of course, consist of another light-emitting element, for example a laser diode.

The component described above is intended for connection to a light guide. However, the invention is not limited to this case but may be applied to and provides the same advantages in other fields of use as well, for example when light is sent in against or sent out from the semiconductor elements included in the component with the aid of lens systems or the like.

By the term "light" used above is meant in this application electromagnetic radiation both within the visible wavelength band and within adjacent wavelength ranges.

Instead of the bayonet socket described above for connection of a light guide, other connection means may, of course, be used.

I claim:

1. An optoelectronic component for emitting and/or receiving light, and a housing (3), a first (2) and a second (1) optoelectronic semiconductor element (1) as well as a semitransparent mirror (5) for deflecting incident and/or emitted light to or from the first semiconductor element, wherein the mirror and the first semiconductor element are mounted in a first spherical body (4), which is adjustably journalled in a spherical recess (31) in the housing, and that the second semiconductor element (1) is mounted in a second spherical body (6) which is adjustably journalled in a cylindrical recess in the first spherical body (4).

2. An optoelectronic component according to claim 1, wherein the housing comprises members (32, 33, 34, 35) for connection of a light guide (7, 8) for transmission of light to and/or from the optoelectronic semiconductor elements.

3. An optoelectronic component according to claim 1, wherein the first spherical body (4) is provided with a recess (42) in which the mirror (5) is mounted.

4. An optoelectronic component according to claim 1, wherein the first spherical body (4) is provided with an opening (45) in which the first semiconductor element (2) is mounted.

5. An optoelectronic component according to claim 1, wherein the centre of rotation (41) of the first spherical body (4) lies at a distance from that part of the mirror (5) in which light from the light guide falling towards the mirror hits the mirror.

6. An optoelectronic component according to claim 1, wherein the first semiconductor element (2) consists of a photodetector and the second semiconductor element (1) of a light-emitting semiconductor element.

* * * * *